US005140336A

United States Patent [19]

Suomi

[11] Patent Number: 5,140,336

[45] Date of Patent: Aug. 18, 1992

[54] NON-RESONANT ANTENNA FOR WIND PROFILERS

[75] Inventor: Verner E. Suomi, Madison, Wis.

[73] Assignee: Wisconsin Alumni Research Foundation, Madison, Wis.

[21] Appl. No.: 576,351

[22] Filed: Aug. 31, 1990

[51] Int. Cl.[5] .................. H01Q 9/040; H01Q 21/000; H01Q 21/120; G01S 13/950

[52] U.S. Cl. .................................. 343/790; 343/731; 343/739; 343/826; 343/844; 342/26

[58] Field of Search ................................ 343/790-792, 343/801, 825, 829, 844, 853, 893, 824, 826, 827; 343/731, 739, 803, 804, 813, 792.5; 342/26, 375

[56] References Cited

U.S. PATENT DOCUMENTS

| | | | |
|---|---|---|---|
| 2,158,376 | 5/1939 | Moser et al. | 343/792 |
| 3,680,147 | 7/1972 | Redlich | 343/792 |
| 3,818,480 | 6/1974 | West | 343/731 |
| 3,836,975 | 9/1974 | Cassel | 343/792.5 |
| 4,161,736 | 7/1979 | Goodman | 343/739 |
| 4,338,608 | 7/1982 | Strauch et al. | 343/779 |
| 4,369,449 | 1/1983 | MacDougall | 343/790 |
| 4,480,255 | 10/1984 | Davidson | 343/791 |
| 4,630,051 | 12/1986 | Adams et al. | 342/133 |
| 4,647,933 | 3/1987 | Hogg | 342/26 |
| 4,656,482 | 4/1987 | Peng | 343/792.5 |

OTHER PUBLICATIONS

Chapter 10 of the ARRL Antenna Book on Log Periodic Arrays, 1988, pp. 10-1 to 10-7.

A. Costa, Antenna Interior de Alta Ganancia para F. M. Review Esp. Electronics (Spain), vol. 23, No. 264, Nov. 1976, pp. 28-30.

Judasz et al., Improved Theoretical and Experimental Models for the Coaxial Colinear Antenna, IEEE Transactions on Antennas & Propagation, vol. 37, No. 3, Mar. 1989, pp. 289-296.

B. B. Balsley et al., "The MST Radar Technique: Potential for Middle Atmospheric Studies", Pageoph, vol. 118, 1980, Birkhauser Verlag, Basel, Switzerland, pp. 452-493.

M. A. Shapiro et al., "The Wave Propagation Laboratory Profiler System and its Applications", Cooperative Institute for Research Environmental Science, University of Colorado, and NOAA/ERL/Wave Propagation Laboratory, Boulder, Colo., 1983.

Tycho Technology, Inc., booklet entitled "Wind Profiling . . . The History, Principles, and Applications of Clear-Air Doppler Radar", 1988.

Advertising Brochure published by Unisys for Wind Profiler Systems publication date unknown.

Brochure published by Vaisala describing the Dora TM Wind Profilers Model 400L Lower Tropospheric Profiler, publication date unknown.

Thierry J. Judasz, "The Coaxial Colinear Antenna: Theoretical and Experimental Models", Ph.D. thesis, Electrical and Computer Engineering, University of Colorado, 1987.

*Primary Examiner*—Michael C. Wimer
*Assistant Examiner*—Peter Toby Brown
*Attorney, Agent, or Firm*—Foley & Lardner

[57] ABSTRACT

An antenna system particularly suited for wind profiling produces a radio beam which can be oriented in each of four directions and optionally in a fifth, vertical direction and four intermediate directions. The antenna has a single array of strings of coaxial-colinear antenna elements. The strings are formed into sections, with each section having a first string portion formed of cable elements which are longer than one-half wavelength of the radio frequency drive signal in the cable and a second string portion formed of cable elements which are shorter than one-half the wavelength of the drive signal, with the two strings being connected together and mounted parallel to and above and below one another. Power is directed to the strings so that the radio frequency power flows in opposite directions in each string portion. The beam radiated from each string portion in each section adds to produce a beams tilted from the normal to the string portions by the same angle for both string portions. The direction of the beam from the strings is changed by reversing the direction of power flowing through the two string portions in each section. The direction of the beam across the array of sections is changed by changing the phase of the power provided to the several sections making up the antenna.

25 Claims, 8 Drawing Sheets

STRING EXCITATION TABLE

| BEAM DIRECTION | PHASE SHIFT BETWEEN SETS OF STRING SECTIONS I | II | III | IV | FEED FOR EACH STRING SECTION |
|---|---|---|---|---|---|
| NW | 0° | 90° | 180° | 270° | A |
| NE | 0° | 90° | 180° | 270° | B |
| SW | 0° | 270° | 180° | 90° | A |
| SE | 0° | 270° | 180° | 90° | B |
| VERTICAL | 0° | 0° | 0° | 0° | A & B |
| W | 0° | 0° | 0° | 0° | A |
| E | 0° | 0° | 0° | 0° | B |
| N | 0° | 90° | 180° | 270° | A & B |
| S | 0° | 270° | 180° | 90° | A & B |

FIG. 9

NON-RESONANT ANTENNA FOR WIND PROFILERS

FIELD OF THE INVENTION

This invention pertains generally to the field of radar antennas and systems and particularly to radar systems utilized for wind velocity profiling.

BACKGROUND OF THE INVENTION

Wind profiler systems are sophisticated radar systems designed to measure the doppler shift in the very weak echos scattered by inhomogeneities in the index of refraction of the atmosphere above the radar station. These systems are intended to allow continuous observation of the wind above a station. Presently, these units have a high cost, typically between three and four hundred thousand dollars a station. The antenna alone accounts for about a third of the cost. The antennas presently used are typically composed of two large, separate arrays of coaxial-colinear (COCO) strings which are positioned orthogonal to each other to provide two beams which generate information on the east-west and north-south components of the wind above the station, and also to provide a third beam to allow measurement of any vertical component of the wind. Thus, the typical wind profiler antennas have three beams which are switched sequentially to a north, east and vertical position. The north and east beams are usually 15° from the zenith, an angle which is a compromise between the strength of the return/echo, the magnitude of the radial wind horizontal component, and the beam separation at maximum altitude. The last factor is important when the wind field is not uniform.

The conventional COCO wind profiler antenna is a string of half-wavelength sections of coaxial cable, with the inner conductor of each section being connected to the outer conductor of the next and the outer conductor of each section connected to the inner conductor of the next. Thus, the outer conductor has the same phase over the length of the string and the radio wave propagates in a direction normal to the string. A wind profiler requires a tilted beam, normally about 15° from the zenith, so that the horizontal component of the wind can be extracted from the radial velocity which causes the doppler shift in the return echo. The beam is tilted in such an antenna by shifting the phase appropriately between the numerous strings which make up the antenna array. Thus, one array can only have the beam radiated from it tilted in one direction. Consequently, the conventional COCO wind profiler antenna requires two orthogonal arrays to provide the north-south as well as the east-west components of the winds. The cable required to feed the antenna strings with signals of the proper phase is very complex. Typically, there is more cable in the feed system than in the antenna itself. The two orthogonal sets of coaxial-colinear strings are mounted above a ground reflecting plane with each string about a half wavelength apart to form a mesh which is typically about 22 wavelengths on a side.

The basic coaxial-colinear or COCO antenna has been used in a variety of radar and communications antenna systems for many years. An early description of this antenna system is provided in the U.S. Pat. No. 2,158,376 to Moser, et al. A complete review of the COCO antenna is provided in a Ph.D. thesis by Thierry J. Judasz at the University of Colorado, August 1987, entitled "The Coaxial Colinear Antenna: Theory and Experimental Models."

Normally, the cable element length L of a COCO antenna is chosen so that $L=\lambda_c/2$, where $\lambda_c$ is the wavelength in the coaxial cable. When these conditions are met, a phase reversal occurs at each section joint and a nearly uniform phase exists along the entire string. Under such conditions, the E field propagates in a direction normal to the string. This antenna can also be considered resonant since the energy reflected from the end of the string can be made to reinforce the primary wave. Special treatment of the end of the array with a quarter wavelength shorted stub and another quarter wavelength extension increases the reflection efficiency and enhances the performance of the array. If, however, the transmitter frequency changes from the frequency for which the antenna was designed, the beam is tilted from the normal position and reflections from the end of the array generate a second beam at a negative angle relative to the first one, with the second beam being weaker than the primary beam. The exact angle of the beams depends on the phase relationships following the reflection. It is possible to terminate the end of the array to remove the reflection with an appropriate resistor, but to do so produces an undesirable loss of power.

SUMMARY OF THE INVENTION

The wind profiling antenna system of the present invention allows a radio beam to be produced which can be oriented in each of the four compass directions and optionally, in a fifth, vertical direction, and four intermediate directions, while utilizing only one array of strings of coaxial-colinear (COCO) antenna elements. Thus, the antenna system of the invention provides beam propagation direction capabilities not available in standard COCO antennas while utilizing essentially half the antenna elements of a conventional wind profiler COCO antenna, thus achieving improved performance at a much lower cost.

The antenna of the present invention comprises an array of parallel antenna sections, with each section composed of a string of coaxial-colinear antenna elements. One-half of the string in each section has coaxial cable elements which are shorter than exactly one-half wavelength of the drive signal, and one-half the string has coaxial cable elements which are longer than one-half wavelength. Consequently, the radiation beam from one-half of the string is oriented at an angle to the normal in one direction and the radiation from the other half of the string is oriented at an angle in the opposite direction with respect to the direction of propagation of the signal. The exact angle of the beam depends on the extent to which the cable elements are longer or shorter than $\lambda_c/2$. The two halves of the string in each section are oriented so that the power flows in opposite directions and thus the radiation beam from each string reinforces that from the other string. Preferably, the two halves of the string are mounted vertically above one another and above a reflecting plane so that the primary beam from each half of the string is effectively reinforced, providing a double beam (with a strong primary beam and weaker secondary beam) when the end of the string is shorted and a single beam when the string is terminated with a resistor sized to match the impedance of the string and thereby eliminate reflections. By shorting the ends of the strings and allowing reflection, so that two beams are radiated, the power loss in the antenna system is minimized. When a single beam is desired to eliminate any 180° ambiguity, the end of the string can be terminated with a resistor through a diode switch.

The orientation of the beam with respect to the normal in each section can be changed by changing the direction of power propagation through the string, which is accomplished using switching elements connected at the feed points to the strings. Switching the direction of the beam from one direction to an orthogonal direction, e.g., from north or south to east or west, can be accomplished utilizing proper phasing of the drive signal provided to the sections across the array. Typically, the phase progression is changed by 360° every four wavelengths separation between rows of strings. If the strings are separated by one-half wavelength, the phase progression required is 45°. If the strings are separated by one wavelength, the phase progression required is 90°. In this manner, a single beam with no 180° ambiguity can be provided which can be switched in any one of four directions (east, west, north, south) with no direction ambiguity. A vertical beam is provided when all string sections are excited with the same phase and the string portions in each section are fed in opposite directions so that the separate beams combine to provide a strong vertical component. Optionally, four additional beam directions (e.g., northeast, northwest, southeast and southwest) can be obtained by proper switching of feed directions and/or phasing across the sections of the array.

The information provided by the beams as they are switched can be readily utilized to determine the wind velocity above the profiler antenna. This system allows such wind velocities to be determined with even greater accuracy than conventional antennas because of the ability to obtain information from five (or more) beam positions rather than the conventional three beam positions.

Further objects, features and advantages of the invention will be apparent from the following detailed description when taken in conjunction with the accompanying drawings.

BRIEF DESCRIPTION OF THE DRAWINGS

In the drawings:

FIG. 9 is a table showing the beam direction for various phase shifts and string excitation combinations.

DETAILED DESCRIPTION OF THE INVENTION

The wind profiler antenna system of the present invention incorporates an antenna array which can be controlled to tilt the radiated beam in a direction along the strings forming the array as well as across the array to provide information on winds from the four points of the compass using only a single array of parallel coaxial-colinear antenna strings. The direction of the beam along the strings can be reversed by reversing the direction in which the radio frequency (RF) energy is fed through the strings.

Figure 1:
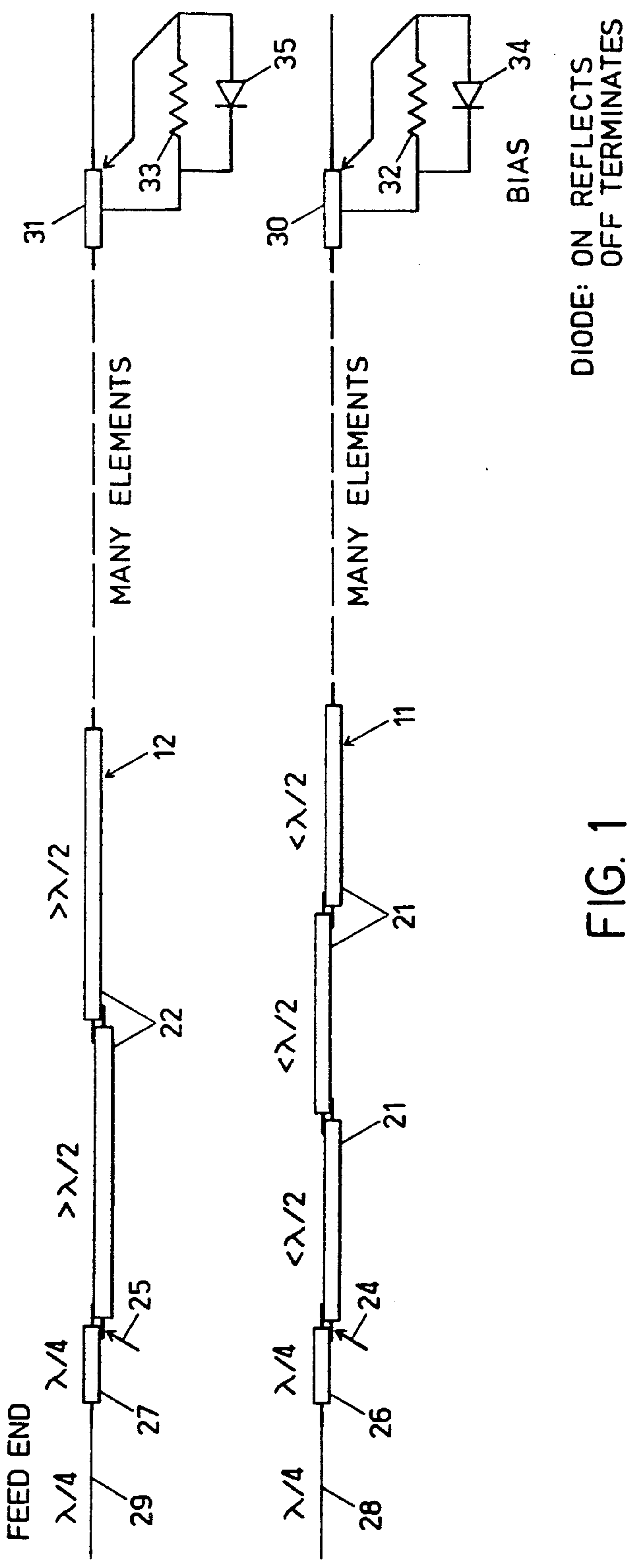
FIG. 1 is an illustrative view of the coaxial-colinear elements in an antenna section which can be switched from a double beam to a single beam.

As illustrated in FIG. 1, an exemplary basic antenna section in accordance with the invention is formed of a string portion 11 of coaxial cable elements 21 which are shorter than one-half a wavelength in the cable and a parallel, adjacent string portion 12 of coaxial cable elements 22 which are longer than one-half wavelength. The strings 11 and 12 of elements 21 and 22 are fed with RF energy by feed lines 24 and 25, respectively, at ends which are terminated by short coaxial cable sections 26 and 27 and stubs 28 and 29, respectively, which are preferably formed to be exactly one-quarter wavelength in the cable. The other end of the strings 11 and 12 of elements 21 and 22 are terminated by coaxial cable segments and stubs 30 and 31, respectively, with terminating resistors 32 and 33, and PIN diodes 34 and 35 connected in parallel with the resistors 32 and 33, respectively. The outer conductor of each cable element 21 and 22 is electrically connected to the inner conductor of the adjacent cable elements.

With the foregoing arrangement of the elements 21 and 22 composing a coaxial-colinear string, there is a progressive phase shift along each string which tilts the beam forward or backward depending on whether the antenna elements are longer or shorter than exactly one-half wavelength. The direction of the beam also depends on the direction in which the RF energy is flowing along the string.

Figure 2:
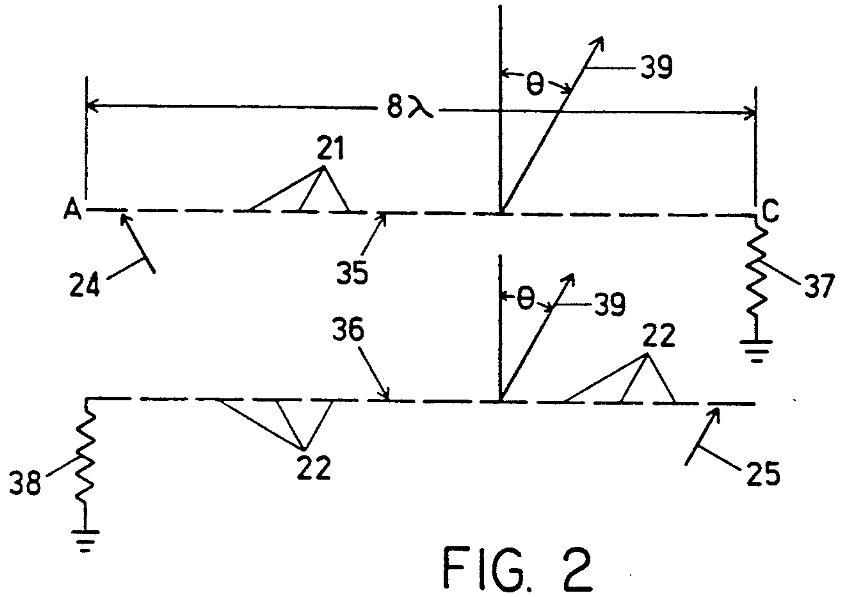
FIG. 2 is a schematic view illustrating the phase progression in two string portions of an antenna section of the present invention with the drive signal provided from opposite ends of each string portion.

FIG. 2 illustrates the phase progression for two separate parallel antenna string portions which provide beams oriented in the same direction. The two string portion 35 and 36 in FIG. 2 are each 8 wavelengths long. The portion 35 has 19 elements 21 each of which is shorter than one-half wavelength in the cable, preferably by about 18%. The portion 36 has 13 elements 22 each of which is longer than one-half wavelength, preferably by about 18%. The resistors 37 and 38 which terminate these portions 35 and 36, respectively, are chosen so that they match the impedance of the antenna string portion so that no reflections come back along the string. In such a case, feeding the string portions 35 and 36 from the left end of portion 35 and the right end of portion 36 (feed points A and B) with an RF drive signal provides beams 39 tilted to the right by an angle $\theta$ for both sections 35 and 36. If the antenna feed points A and B were exchanged to the positions C and D, and the terminating resistors were placed at A and B, the beam would switch its direction from right to left. Thus, the beam direction can be changed by changing the direction of RF energy which propagates along the string. On the other hand, if the terminating resistors are replaced by short circuits, or open circuits, reflection of RF energy from the ends propagates in the opposite direction along each string to form a second beam which is tilted by the same amount but in a opposite direction with respect to the normal to the string. The resulting double beam produces a 180° ambiguity in the wind direction which may be accounted for in accordance with the present invention.

Figure 3:
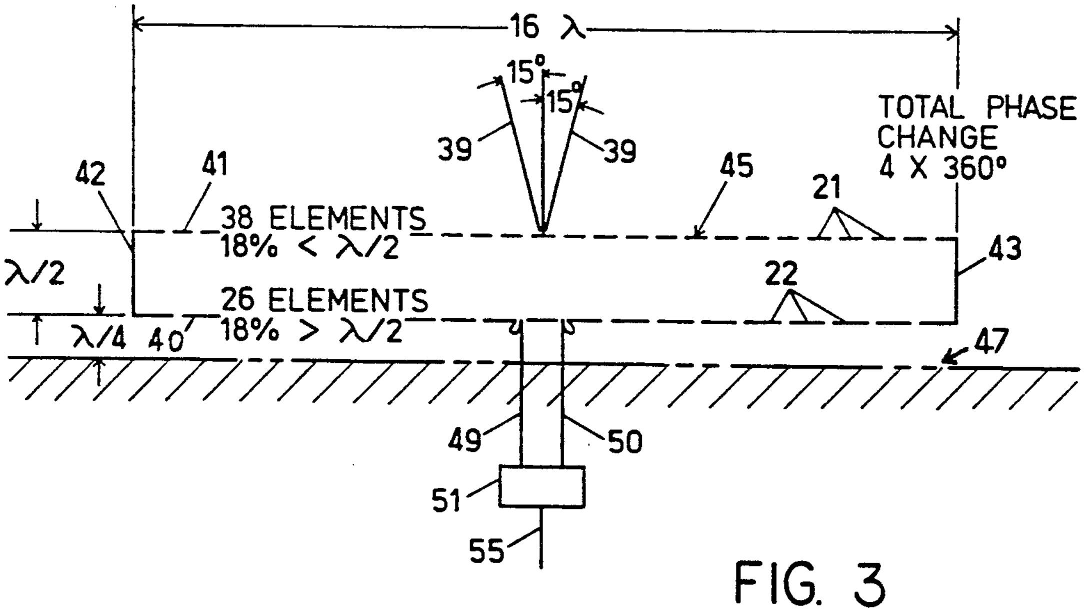
FIG. 3 is a schematic view of the COCO strings in one section of the antenna array of the invention, illustrating the position of the elements in the string with respect to one another.

The antenna section shown in FIG. 3 comprises a lower string 40 of longer elements 22 and an upper string 41 of the shorter elements 21, with connections 42 and 43 between the ends of the strings 40 and 41 to complete the entire antenna section 45. In this example, each of the string portions 40 and 41 is 16 wavelengths long. The 26 elements 22 in the lower string 40 are 18% longer than one-half wavelength and the string 40 is preferably mounted one-quarter wavelength (in air) above a reflecting ground plane 47. The upper string 41 is composed of 38 elements 21 which are 18% shorter than one-half wavelength and is mounted parallel to and one-half wavelength (in air) above the first string 40. The connections 42 and 43 are open lines or air dielectric pairs of coaxial cables preferably exactly one-half wavelength in length so that the radiation from the upper string 41 adds to that leaving the lower string 40. The double coaxial connections on each end prevent radiation from the ends. A coaxial cable exactly one-half wavelength will reflect the impedance of the feed at each end irrespective of the characteristic impedance of the cable. The total length of the string must be an odd multiple of $\lambda_c/2$ to provide the proper phase from the reflections.

Figure 4:
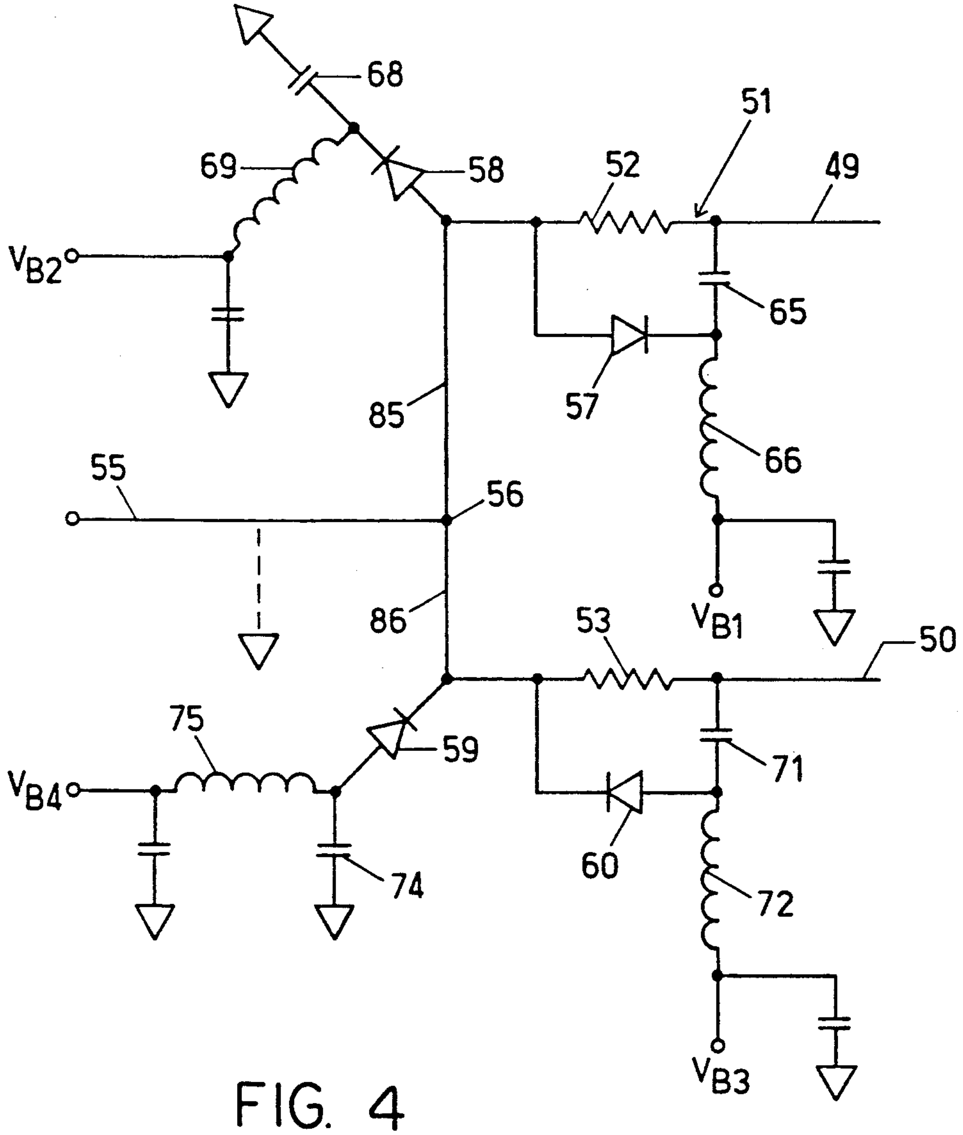
FIG. 4 is a schematic diagram of the connecting elements by which the signal from the feed coaxial cable is provided to the elements of the strings of each antenna section.
Figure 5:
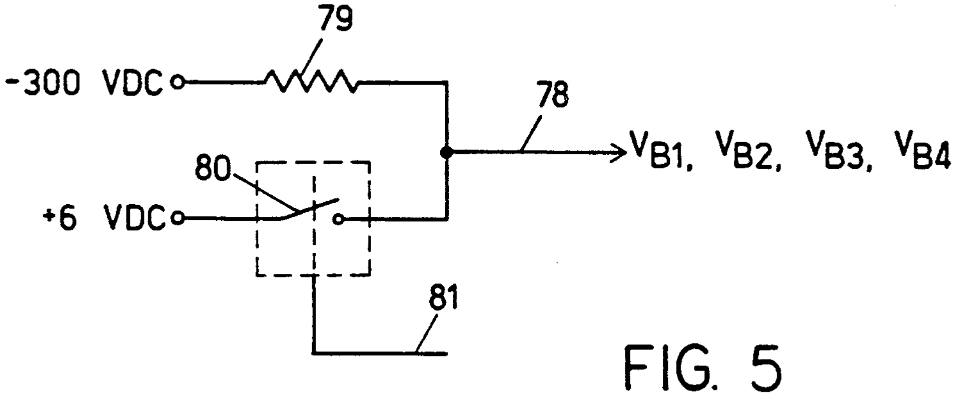
FIG. 5 is an exemplary bias control circuit which can be used to apply the bias potentials in the circuit of FIG. 4.
Figure 11:
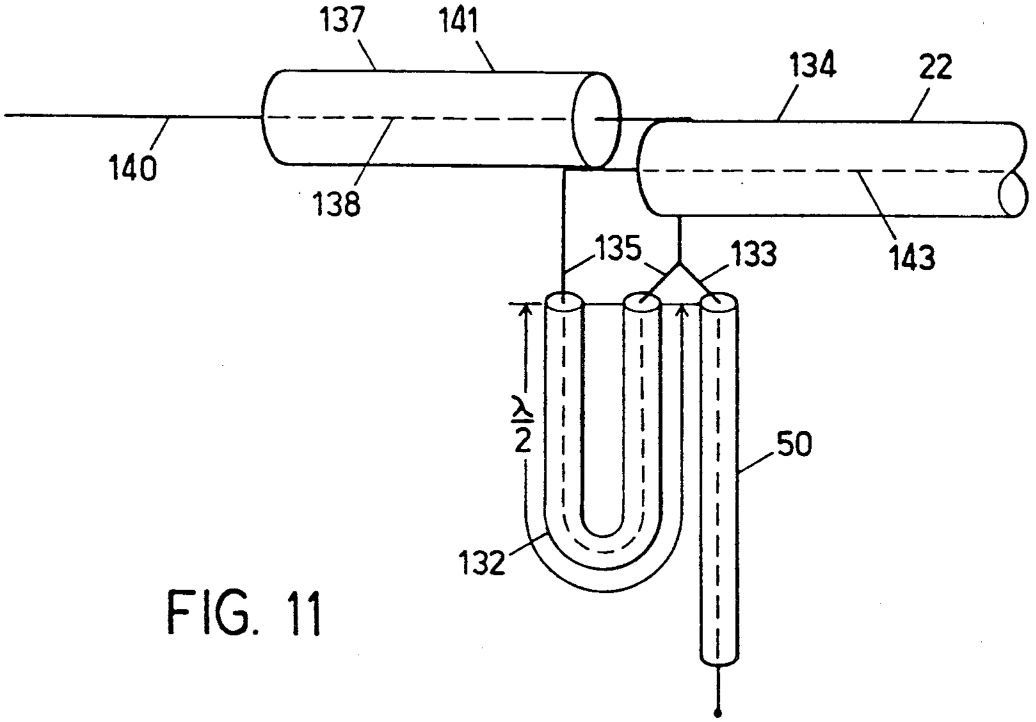
FIG. 11 is an illustrative schematic view of an exemplary connection between the feed cable and the antenna in the present invention.

When RF drive signal energy is provided through the antenna feed line 49 to the feed point A (terminated as shown in FIG. 11), a beam tilted to the right will be formed. Alternatively, if the RF energy is fed through the feed line 50 to the point B (terminated as shown in FIG. 11), the beam tilts in the opposite direction. In either case, if the end of the string opposite the feed end is terminated by a resistor which matches the impedance of the line comprising the antenna, no reflections will occur or the reflections will be greatly suppressed so that a single beam is formed which can be switched to the left or right, as desired, by reversing the feed points and the resistor terminations. Alternatively, a double beam is possible by short circuiting either the terminating resistor 52 or the terminating resistor 53 in the switching circuit 51, which is shown schematically in FIG. 4. If both terminating resistors 52 and 53 are short circuited, then the input lines 49 and 50 are both supplied with RF power and a broader vertical beam is formed. The switching of the resistors 52 and 53 into and out of the circuit is accomplished utilizing PIN diodes 57–60, with the diode 57 being connected in parallel with the resistor 52 and the diode 60 in parallel with the resistor 53, and with the diode 58 being connected between the resistor 52 and ground and the diode 59 connected between the resistor 53 and ground. Exemplary biasing circuits utilized to bias the diodes 57–60 properly to short out one or both of the resistors 52 or 53, as desired, are shown in FIG. 4. The biasing components shown in FIG. 4 include a bypass capacitor 65 (an RF short) connected with the diode 56 around the resistor 52 and an RF choke coil 66 which is connected to supply a DC bias voltage $V_{B1}$ to the junction between the diode 56 and capacitor 65. A capacitor 68 is connected between the diode 5B and ground, and a bias voltage $V_{B2}$ is supplied to the junction between the diode 58 and capacitor 68 through an RF choke coil 69. An RF bypass capacitor 71 is connected with the diode 60 in a bypass loop around the resistor 53, and DC bias voltage $V_{B3}$ is provided through an RF choke coil 72 to the junction between the diode 60 and the capacitor 71. A capacitor 74 is connected between the diode 59 and ground and DC bias voltage $V_{B4}$ is provided through an RF choke coil 75 to the junction between the diode 59 and the capacitor 74. An exemplary DC bias supply is shown in FIG. 5 which includes an output line 78 connected to a high negative voltage (e.g., −300 V) through a resistor 79 when a relay switch 80 is open and is connected to a low positive voltage source (e.g., +6V) when the switch 80 is closed, the relay switch 80 being controlled by a signal on a control line 81 from a system controller (not shown in FIG. 5). Circuits as shown in FIG. 5 may be used to supply the bias voltages $V_{B1}$, $V_{B2}$, $V_{B3}$ and $V_{B4}$ in the switching circuit 51 of FIG. 4.

Figure 6:
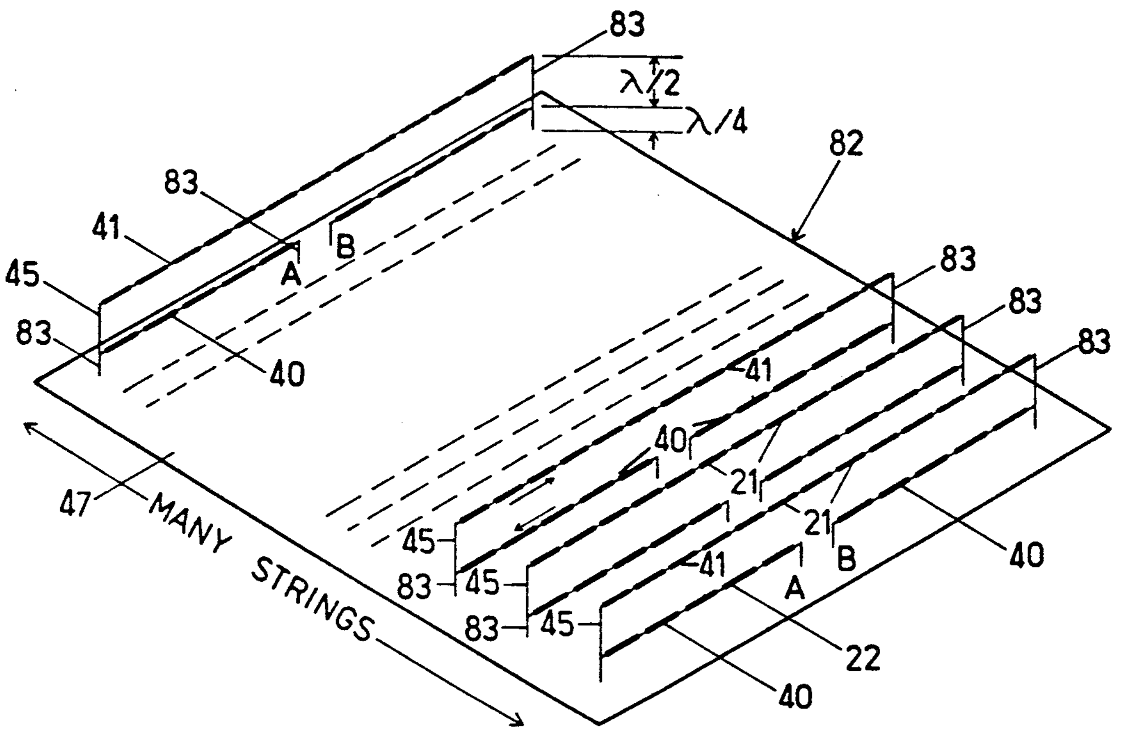
FIG. 6 is an illustrative perspective view of a wind profiler antenna system in accordance with the present invention.

A plurality of string sections 45 in parallel alignment (e.g., 16) are utilized to form the complete antenna array 82 as shown in FIG. 6. The number of coaxial cable elements 21 and 22 and the number of string sections 45 can be selected depending on whether a narrower or broader beam is desired. In the most elementary arrangement, if the RF signal feed is connected to the point A in FIG. 6, the beam will be tilted to the right. Because the RF energy is propagated to the left on the lower string portion 40, composed of long elements 22, and propagated to the right on the upper string portion 41, composed of shorter elements 21, the radiation from both portions add to form a beam of greater gain than that of a single portion.

If the string sections 45 are oriented in north-south direction, the beam can thus be switched to tilt either to the north or to the south. The antenna of the present invention also is constructed to allow the beam to be switched east and west, that is, across the array. The beam may be switched across the array in a manner similar to that utilized in conventional COCO wind profiler antennas. RF energy is provided to each of the string sections 45 with an appropriate phase which is changed progressively from one string to the next. For example, the phase progression may be caused to change by 360° every four wavelengths separation between sections of strings. If the string sections are separated by one-half wavelength, the phase progression required is 45°. If the string sections are separated by one wavelength, the phase progression required is 90°. The antenna may have a form in which it has multiples of 5 strings to 4 wavelengths, which has a progression of 72° between adjacent strings. Any of the foregoing as well as other manners of shifting the beam across the strings may be utilized. Each of these methods provides a single beam and thus no 180° ambiguity.

In the foregoing manner, a beam can be switched in any one of 5 directions with no direction ambiguity. Four separate beams can be formed which will be tilted toward one of the four corners of the array depending on the direction of feed to each antenna section and the phasing across the array. When all the sections of the array are excited with the same phase, and both terminating resistors connected to each string are short circuited, the separate beams combine to provide a strong vertical component for a quasi fifth beam. The fifth beam is relatively broad, but the reflectivity in the vertical direction is 15 db greater than the reflectivity a few degrees off the vertical, so the fifth beam effectively acts as a vertical beam. Thus, with only one antenna array, the present invention provides five individual beams which can be switched separately or in combination.

In a conventional three beam system it is necessary to have a vertical beam to measure the vertical component of the wind independent of any horizontal motion to correct for the effects that vertical motion might have on the radial velocities observed by the tilted beams. For a 15° tilted beam, an error of one meter per second (m/s) in the vertical wind gives rise to 4 m/s error in the horizontal wind. However, such error does not occur in the four beam system of the present invention, thereby effectively making the vertical beam redundant.

For example, it may be assumed that the wind lies in a plane defined by two opposing beams, that is, a double beam. One beam will generate an up doppler signal while the opposing beam will generate a down doppler signal. Thus, the relationships between the beam signals are as follows:

$$\text{Up Doppler} = +U \cos\theta + W \sin\theta$$

and, $$\text{Down Doppler} = -U \cos\theta + W \sin\theta,$$

where U and W are the horizontal and vertical components of the wind, respectively, and $\theta$ is the angle of the beam. The sum of the foregoing two expressions is proportional to twice the vertical wind and the difference is proportional to twice the horizontal wind. The vertical wind is obtained independently of the large and confusing zero doppler signal which is caused by fixed targets on the surface. Reflections from moving targets such as airplanes or automobiles would have the same doppler shift in both beams. While they would cause a very large error in the vertical wind component at target distance, they would cancel in the horizontal wind computation. Normal vertical motion constraints can be applied to remove the apparent vertical wind errors. The manner in which the wind components are computed in the present invention thus has significant advantages over the manner of computation in a three beam antenna system, particularly when precipitation causes large vertical wind component errors.

Figure 7:
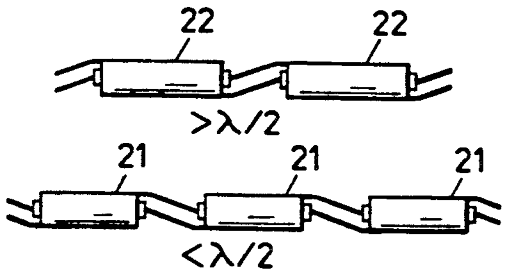
FIG. 7 is an illustrative view of the connection between the coaxial cable elements of the antenna.

The elements 21 and 22 of the COCO antenna sections 45 of the present invention may be formed of conventional coaxial cable. To keep the cable losses as low as possible, rigid aluminum coaxial cable such as that utilized in television cable is satisfactory. It is desirable to minimize reflections caused by impedance changes at each of the many joints between the cable elements. Two methods of joining the cable elements can be utilized, a simple lap joint as shown in FIG. 7 and a more elaborate joint wherein a very short section of the outer conductor is wrapped around the copper coated inner conductor. An aluminum solder, such as that available from the J. W. Harris Co., Cincinnati, Ohio, is satisfactory for providing a good electrical connection between the conductors.

To obtain a beam tilted by 15°, a preferred length L of each long coaxial cable element 22 is preferably $L = 1.18*0.98*\lambda_c/2$, where $\lambda_c$ is the wavelength in the coaxial cable. The factor 0.98 is provided to reduce the length of the coaxial cable section to account for end effects. The shorter wavelength elements 21 preferably have length 1 such that $1 = 0.82*0.98*\lambda_c/2$. Other tilt angles are possible by increasing or decreasing the ratio of the elements to the wavelength.

As shown in FIG. 6, the entire antenna array is assembled from a plurality (e.g., 16) of string sections 45 which are oriented parallel to one another above the ground plane 47 mounted on support posts 83. The ground plane 47 is a conducting plane reflector which is formed in a conventional manner for wind profiler antennas, such as a grid of copper or aluminum wires acting as reflectors.

The RF direction switch 51 for each string section 45 is shown schematically in FIG. 4 and an exemplary bias control circuit for use therewith shown in FIG. 5. A power splitter 56 from the main feed cable 55 is attached to two quarter wavelength stubs 85 and 86. When the diode 59 conducts (for an east wind measurement) the RF energy is reflected by the stub 86 and the diode 58 is biased off. Since the diode 57 is also conducting, the transmitter is effectively connected to the string at end A by the connecting line 49 and the end B of the string at the line 50 is terminated by the resistor 53 because the diode 60 is biased off. To obtain a west beam, the biasing of the diodes to conducting and off states is reversed. The diode control circuit specifications and the PIN diode characteristics are determined in a conventional manner by the power levels required. If peak power of 16 kilowatts is utilized, each string must be capable of handling 1 kilowatt. If a 50 ohm characteristic impedance feed cable is used, the RMS voltage across the cable will be about 223 volts, but the peak voltage will be about 316 volts. Since a bias of 316 volts is required to keep the PIN diodes nonconducting, the total voltage across the PIN diodes at this power level is about 650 volts. Suitable commercially available PIN diodes may be used which meet this specification. The foregoing example is for a rather high power condition. In a typical wind profiler a coded signal pulse is used to lengthen the duty cycle to reduce the peak power, but at the same time the coded signal allows very good height resolution.

Figure 8:
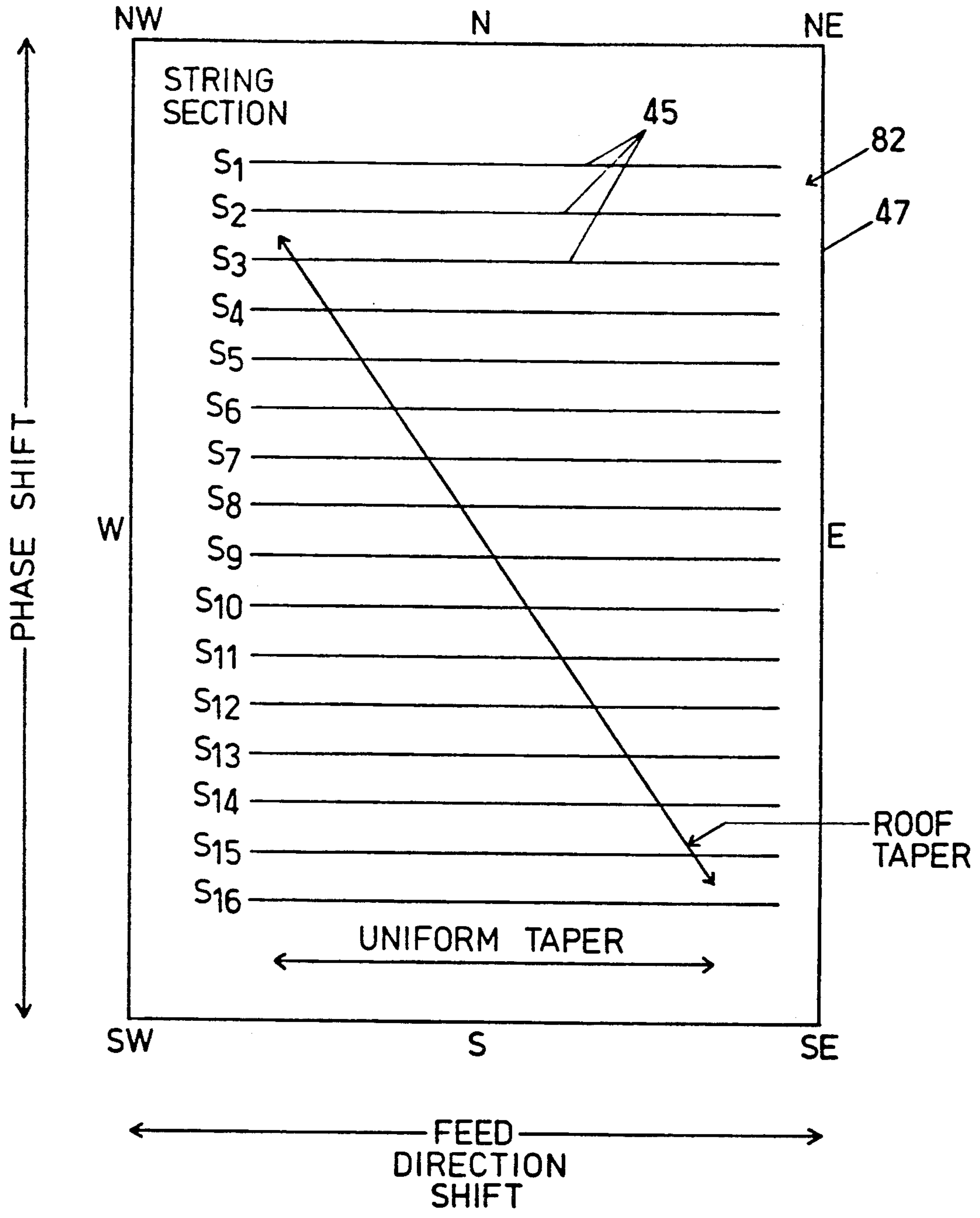
FIG. 8 is a schematic plan view of an antenna array of the invention illustrating the beam steering directions.

The schematic plan view of the antenna array 65 of FIG. 8 further illustrates the manner in which the antenna sections may be fed to provide a beam of a desired orientation. The 16 string sections 45 are denoted $S_1$ to $S_{16}$ in FIG. 8. These sections are supplied with RF power in sets of four sections, e.g., set I:$S_1$ to $S_{16}$; set II:$S_5$ to $S_8$; set III:$S_9$ to $S_{12}$; set IV:$S_{13}$ to $S_{16}$. The table in FIG. 9 is an exemplary RF supply pattern showing the beam direction with various combinations of phase shift and feed direction for the sections. With this arrangement, the phase of the supply to set I is never changed, and the supply to set II is changed only for the vertical and due east and west beam directions. In this manner it is possible to obtain nine beam directions. For beams oriented toward the four diagonals (NW, NE, SW, SE), the antenna array has a "roof" taper, rather than a uniform taper with the beam oriented due N, S, E or W, resulting in a better suppression of side lobes. Of course, the array 65 may be laid out on the ground in any appropriate orientation.

The PIN diode control electronics provides the 300–400 volt bias required for the diodes. These voltages are well within typical power CMOS field effect transistor ranges. The power required for the biased off condition of the diodes is quite low, less than a watt. However, in the on condition, about 1 ampere of forward bias circuit is required for each PIN diode which is biased on. Since only a volt or two is required, the total power needed is still under 200 watts. When the switching rate for each beam is slow, simple relays may be used. Switching rates for a typical wind profiler application vary from about once per second to once every several minutes, and any suitable commercial relay can be utilized to provide such switching.

Figure 10:
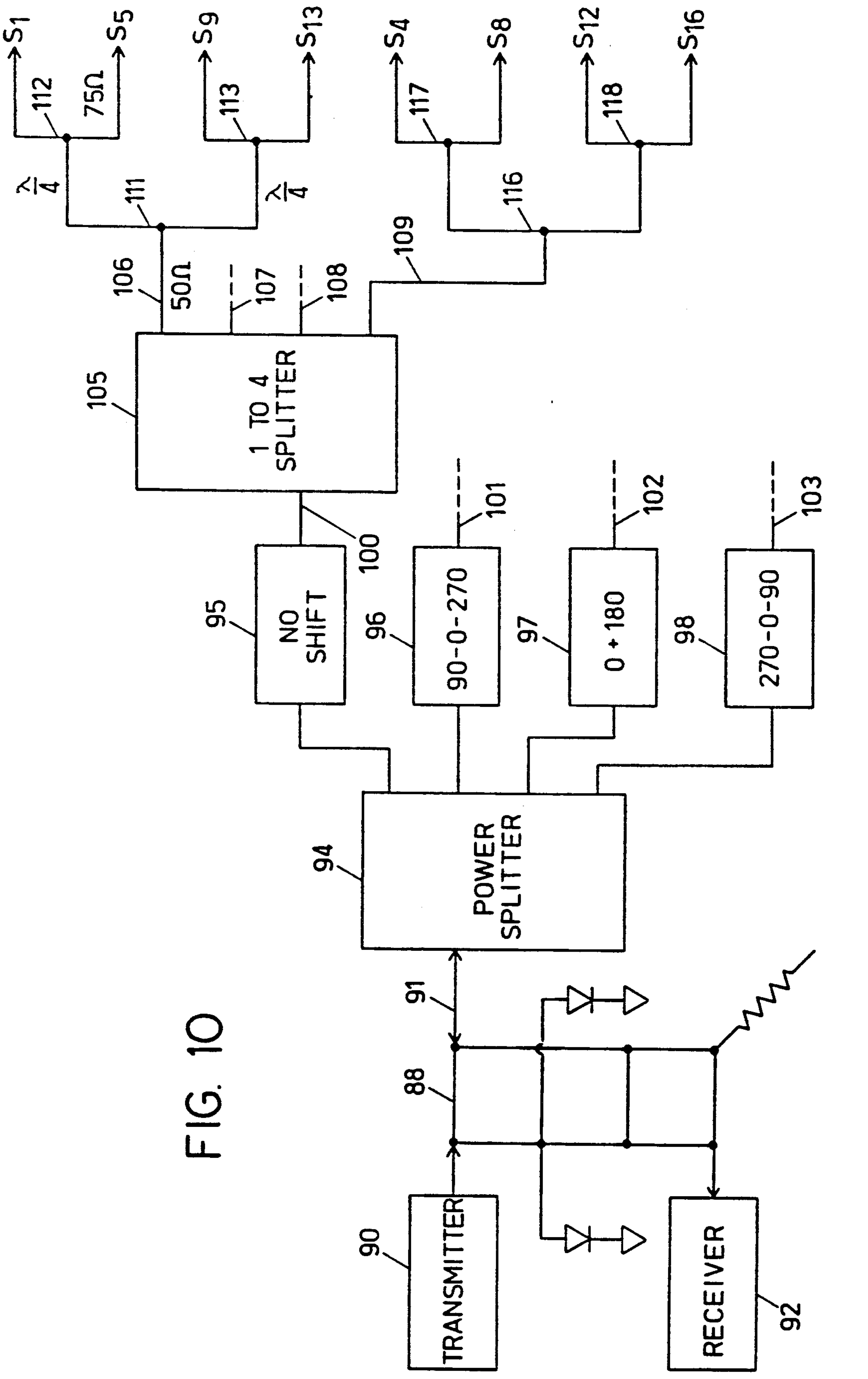
FIG. 10 is a schematic diagram of the RF connection to the antenna array.

An exemplary power distribution system for supplying the array is shown in FIG. 10. A 90° hybrid 88 couples RF power from a transmitter 90 to an output line 91 and couples the received signal from the line 91 to a receiver 92. The output power on the line 91 passes through a 4 way power splitter 94 which splits the power to four outputs, a line 95 (no phase shift), a shifter 96 (90°-0°-270°), a shifter 97 (0° and 180°) and a shifter 98 (270°-0°-90°), which provide output on lines 100, 101, 102 and 103, respectively. For clarity of illustration, the further connections for only one (the line 100) of the output lines 100-103 is shown in FIG. 10, it being understood that the others are similar. As shown therein, the power on the line 1? 0 is received by a 1 to 4 splitter 105 which provides output on lines 106, 107, 108 and 109. The output on the line 106 is provided to a 1 to 2 power splitter 111 and thence to 1 to 2 power splitters 112 and 113 which have outputs connected to sections $S_1$, $S_5$, $S_9$ and $S_{13}$. The output on the line 109 is provided to a 1 to 2 power splitter 116 and thence to 1 to 2 power splitters 117 and 118 which have outputs connected to sections $S_4$, $S_8$, $S_{12}$ and $S_{16}$. The output on lines 107 and 108 are split in a similar manner by splitters (not shown) to supply power to sections $S_2$, $S_6$, $S_{10}$ and $S_{14}$ and sections $S_3$, $S_7$, $S_{11}$ and $S_{15}$, respectively.

The feed line from the transmitter to the antenna is normally an unbalanced line, i.e., a coaxial cable with the outer conductor at ground potential. The antenna elements comprise a balanced line, i.e., both the inner and outer conductors of the antenna elements have an RF potential above ground. Thus, as illustrated in FIG. 11, at each antenna feed point from a feed cable (e.g., the line 50) to the antenna cable elements (for illustration, the elements 22), an unbalanced to balanced transformer 132, called a Balun, is required. The Balun 132 can be a half wavelength long coaxial cable or an actual RF transformer similar to (but with greater power carrying capacity) those used in commercial television to transform a 75 ohm coaxial cable to a 300 ohm television antenna input.

In the illustrative connection shown in FIG. 11, the inner conductor 133 of the cable is electrically connected to the outer conductor 134 of the coaxial cable elements 22 and to the inner conductor 135 of the Balun 132. The inner conductor 135 of the Balun is connected to the outer conductor of a quarter wavelength coaxial cable terminating element 137. The inner conductor 138 of the element 137 is connected to a quarter wavelength shorted stub 140. The outer conductor 141 of the coaxial element 137 is electrically connected to the inner conductor 143 of the coaxial element 22, and the inner conductor 138 of the coaxial element 137 is connected to the outer conductor 134 of the element 22. A similar termination connection is used to connect the cable 49 to the antenna.

Figure 12:
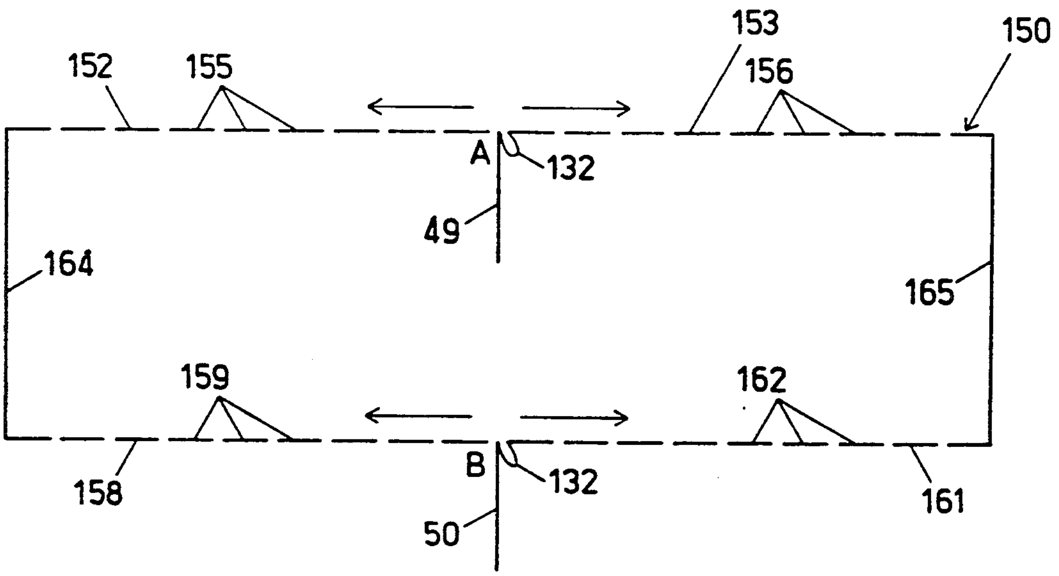
FIG. 12 is a schematic view of another arrangement of a section of the antenna of the invention.

FIG. 12 illustrates a further antenna section 150 of the invention which may be substituted for the section 45. The antenna section 150 has an upper string composed of two half portions 152 and 153, the portion 152 composed of coaxial elements 155 which are longer than $\lambda_c/2$ and the portion 153 composed of coaxial elements 156 shorter than $\lambda_c/2$. A lower string is formed of a portion 158 having coaxial elements 159 shorter than $\lambda_c/2$ and a portion 161 having elements 162 longer than $\lambda_c/2$. An air dielectric cable 164 or equivalent connects the portion 152 and the portion 158 and an air dielectric cable 165 connects the portions 153 and 161. The feed point A from the line 49 is a center feed point which feeds the portions 152 and 153 in opposite directions, and the feed point B from the line 50 is a center feed point which feeds the portions 158 and 161 in opposite directions. The electrical connections from the lines 49 and 50 to the coaxial elements may be the same as shown in FIG. 11 with the coaxial elements 155 and 156 or 159 and 162 replacing the elements 137 and 22 of FIG. 11. Because the direction of energy propagation is in one direction for the string portions formed of shorter elements, and in the opposite direction for the string portions formed of longer elements, the beam from each portion will add. The upper and lower strings are preferably spaced one-half wavelength (in air) apart as before.

It is understood that the invention is not confined to the particular embodiments illustratively set forth herein, but embraces such modified forms thereof as come within the scope of the following claims.

What is claimed is:

1. An antenna section which may be used in a wind profiler system which is provided with a selected RF drive signal, comprising:

(a) a first string portion formed of plural coaxial cable elements, each having inner and outer conductors, electrically connected together in a coaxial-colinear arrangement with the inner conductor of each coaxial cable element electrically connected to the outer conductor of the next element in the string portion and the outer conductor of each coaxial cable element electrically connected to the inner conductor of the next element in the spring portion, the coaxial cable elements of the first string portion having a selected length longer than one-half the wavelength in the cable of the drive signal such that when the drive signal is provided to the first string portion a beam radiated from the first string portion is tilted at an angle to a normal to the first string position;

(b) a second string portion formed of coaxial cable elements electrically connected together in a coaxial-colinear arrangement, the second string portion positioned adjacent and parallel to the first string portion, the coaxial cable elements of the second string portion having a selected length which is shorter than one-half the wavelength in the cable of the drive signal such that when the drive signal is provided to the second string portion a beam radiated from the second string portion is tilted at an angle to a normal to the second string portion; and (c) means for providing the selected drive signal to the first and second string portions such that the drive signal is fed through the string portions in opposite directions so that the beams radiated from the two string portions add together.

2. The antenna section of claim 1 wherein the coaxial cable elements of the second string portion are shorter than one-half the wavelength by substantially the same percentage that the first string cable elements are longer than one-half the wavelength.

3. The antenna section of claim 1 wherein each string portion has two ends and a characteristic impedance, one of the ends of each string portion being terminated in a resistor having the characteristic impedance of the string portion to minimize reflections.

4. The antenna section of claim 1 wherein the first and second string portions are mounted above ground and one of the string portions is mounted vertically above the other string portion.

5. The antenna section of claim 4 wherein the cable elements in the upper one of the two string portions are longer than the cable elements in the lower one of the two string portions.

6. The antenna section of claim 1 wherein the longer cable elements are longer than one-half the wavelength in the cable of the drive signal by about 18% and the shorter cable elements are shorter than one-half of such wavelength by about 18%.

7. An antenna section which may be used in a wind profiler system which is provided with a selected RF drive signal comprising:

(a) a first string portion formed of coaxial cable elements electrically connected together in a coaxial cable arrangement, the coaxial cable elements of the first string portion having a selected length longer than one-half of the wavelength in the cable of the drive signal such that when the drive signal is provided to the first string portion a beam radiated from the first string portion is tilted at an angle to a normal to the first string portion; and (b) a second string portion formed of coaxial cable elements electrically connected together in a coaxial-colinear arrangement, the second string portion positioned adjacent and parallel to the first string portion, the coaxial cable elements of the second string portion having a selected length which is shorter than one-half the wavelength in the cable of the drive signal such that when the drive signal is provided to the second string portion a beam radiated from the second string portion is tilted at an angle to a normal to the second string portion wherein the first and second string portions are mounted above the ground and one of the string portions is mounted vertically above the other string portion, and wherein the two string portions each have two ends and are electrically connected at their ends to one another.

8. The antenna section of claim 7 wherein the two string portions are separated from each other by a distance equal to one-half the wavelength in air of the beams radiated from the string portions when provided with the drive signal and the lower string portion is mounted one-quarter of such wavelength above a ground plane reflector.

9. The antenna section of claim 7 wherein the lower string portion is separated into two parts at its center to define two center feed points, and including means for selectively feeding the drive signal to one or the other of the two center feed points of the lower string portion and for selectively terminating the other feed point.

10. The antenna section of claim 9 wherein the means for terminating includes means for selectively connecting the terminated feed point of the lower string portion to a resistor.

11. An antenna system for wind profilers which is provided with a selected RF drive signal comprising:

(a) a plurality of antenna sections mounted parallel to one another in an array, each antenna section comprising:

(1) a first string portion formed of plural coaxial cable elements, each element having inner and outer conductors, electrically connected together in a coaxial-colinear arrangement with the inner conductor of each coaxial cable element electrically connected to the outer conductor of the next element in the string portion and the outer conductor of each coaxial cable element electrically connected to the inner conductor of the next element in the string portion, the coaxial cable elements of the first string portion having a selected length longer than one-half of the wavelength in the cable of the drive signal such that when the drive signal is provided to the first string portion a beam radiated from the first string portion is tilted at an angle to a normal to the first string portion;

(2) a second string portion formed of plural coaxial cable elements, each element having inner and outer conductors, electrically connected together in a coaxial-colinear arrangement with the inner conductor of each coaxial cable element electrically connected to the outer conductor of the next element in the string portion and the outer conductor of each coaxial cable element electrically connected to the inner conductor of the next element in the string portion, the second string portion positioned adjacent and parallel to the first string portion, the coaxial cable elements of the second string portion having a selected length which is shorter than one-half of the wavelength in the cable of the drive signal such that when the drive signal is provided to the second string portion a beam radiated from the second string portion is tilted at an angle to a normal to the second string portion, wherein the coaxial cable elements of the second string portion of each antenna section are shorter than one-half the wavelength in the cable of the drive signal by substantially the same percentage that the first string portion cable elements are longer than one-half of such wavelength; and (b) a reflector positioned beneath the plurality of antenna sections.

12. The antenna system of claim 11 including means for providing radio frequency drive signal energy to the antenna sections to provide a radiated beam from the antenna in a selected direction.

13. The antenna system of claim 12 including means for feeding a drive signal to the first and second string portions of each antenna section such that the drive signal is fed through the string portions in opposite directions such that the radiated beams from the string portions add together.

14. The antenna system of claim 11 wherein the antenna includes 16 antenna sections.

15. The antenna system of claim 11 wherein each string portion of each antenna section has two ends and a characteristic impedance, one of the ends of each string portion being terminated in a resistor having the characteristic impedance of the string portion to minimize reflections.

16. The antenna system of claim 11 wherein each of the first and second string portions is mounted above the reflector and one of the string portions of each antenna section is mounted vertically above the other string portion.

17. The antenna system of claim 16 wherein the two string portions of each antenna section each have two ends and are electrically connected to one another at their ends.

18. The antenna system of claim 17 wherein the two string portions are separated from each other by one half the wavelength in air of the beams radiated from the string portions when provided with the drive signal and the lower string portion of each antenna section is mounted one-quarter of such wavelength above the reflector.

19. The antenna system of claim 17 wherein the lower string portion of each antenna section is separated into two parts at its center to define two center feed points, and including means for selectively feeding the drive signal to one or the other of the two center feed points of the lower string portion and for selectively terminating the other feed point.

20. The antenna system of claim 19 wherein the means for selectively terminating includes means for selectively connecting the terminated feed point of the second string portion to a resistor.

21. The antenna system of claim 16 wherein the cable elements in the lower one of the two string portions of each antenna section are longer than the cable elements in the upper one of the two string portions.

22. The antenna system of claim 11 wherein the longer cable elements of each antenna section are longer than one-half the wavelength in the cable of the drive signal by about 18% and the shorter cable elements are shorter than one-half of such wavelength by about 18%.

23. A method of radiating a beam from an antenna comprising:

(a) providing an antenna having an antenna section with first and second string portions, each formed of plural coaxial cable elements, each element having inner and outer conductors, which are mounted adjacent and parallel to one another, the coaxial cable elements in each string portion electrically connected together in a coaxial-colinear arrangement with the inner conductor of each coaxial cable element electrically connected to the outer conductor of each coaxial cable element electrically connected to the inner conductor of the next element in the string portion, the cable elements of one string portion being longer than the cable elements of the other string portion; and (b) feeding radio frequency power to one of the string portions to propagate along that string portion in a first direction and feeding radio frequency power to the other string portion to propagate along the other string portions in the opposite direction at a radio frequency such that one-half the wavelength of the radio frequency drive signal in the cable is longer than the length of the cable elements in one of the string portions and shorter than the length of the cable elements in the other string portion by substantially the same percentage such that the beams radiated from the two string portions are tilted from a normal to the string portions and wherein the beams from the two string portions add together.

24. The method of claim 23 including the further step of changing the direction of feed of the radio frequency power to the two string portions to reverse the directions of radio frequency power in the two string portions and to switch the direction of the beams radiated from the two string portions.

25. The method of claim 24 including the step, while feeding the radio frequency power to an end of each of the string portions, of terminating the ends of the string portions opposite to the ends which are provided with radio frequency power with a terminating resistor to minimize refections.

* * * * *

UNITED STATES PATENT AND TRADEMARK OFFICE
CERTIFICATE OF CORRECTION

PATENT NO. : 5,140,336

DATED : August 18, 1992

INVENTOR(S) : Verner E. Suomi

It is certified that error appears in the above-identified patent and that said Letters Patent is hereby corrected as shown below:

Column 4, line 55, "portion" should be --portions--.

Column 6, line 5, "5B" should be --58--.

Column 8, line 52, "$S_{16}$" should be --$S_4$--.

Column 9, line 26, "1?0" should be --100--.

Column 10, line 37, after "each" add --element--.

Column 10, line 51, "position" should be --portion--.

Column 11, line 28, change "coaxial" to --coaxial-colinear--.

Column 11, line 29, the first occurrence of "cable" should be deleted.

Column 14, line 10, after "conductor" add --of the next element in the string portion and the outer conductor--.

Signed and Sealed this

Thirty-first Day of August, 1993

Attest:

BRUCE LEHMAN

*Attesting Officer* *Commissioner of Patents and Trademarks*